United States Patent
Adkisson et al.

(10) Patent No.: US 7,475,302 B2
(45) Date of Patent: Jan. 6, 2009

(54) DECODED MATCH CIRCUIT FOR PERFORMANCE COUNTER

(75) Inventors: Richard W. Adkisson, Dallas, TX (US); Gary B. Gostin, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 703 days.

(21) Appl. No.: 10/945,056

(22) Filed: Sep. 20, 2004

(65) Prior Publication Data

US 2005/0039084 A1 Feb. 17, 2005

Related U.S. Application Data

(63) Continuation-in-part of application No. 10/635,083, filed on Aug. 6, 2003, now Pat. No. 7,424,397, and a continuation-in-part of application No. 10/635,373, filed on Aug. 6, 2003, now Pat. No. 7,331,003.

(51) Int. Cl.
*G01R 31/28* (2006.01)
*G06F 13/36* (2006.01)

(52) U.S. Cl. .................. 714/724; 714/733; 710/113

(58) Field of Classification Search ............... 714/724, 714/733; 710/113
See application file for complete search history.

(56) References Cited

U.S. PATENT DOCUMENTS

| | | | |
|---|---|---|---|
| 5,651,112 A | 7/1997 | Matsuno et al. | |
| 5,796,633 A | 8/1998 | Burgess et al. | |
| 5,835,702 A | 11/1998 | Levine et al. | |
| 5,881,223 A | 3/1999 | Agrawal et al. | |
| 5,887,003 A * | 3/1999 | Ranson et al. | ............... 714/736 |
| 6,112,317 A | 8/2000 | Berc et al. | |
| 6,112,318 A | 8/2000 | Jouppi et al. | |
| 6,360,337 B1 | 3/2002 | Zak et al. | |
| 6,463,553 B1 | 10/2002 | Edwards | |
| 6,487,683 B1 | 11/2002 | Edwards | |
| 6,502,210 B1 | 12/2002 | Edwards | |
| 6,519,310 B2 * | 2/2003 | Chapple | ........................ 377/1 |
| 6,539,502 B1 * | 3/2003 | Davidson et al. | ............... 714/47 |
| 6,546,359 B1 | 4/2003 | Week | |
| 6,557,119 B1 | 4/2003 | Edwards et al. | |
| 6,615,370 B1 | 9/2003 | Edwards et al. | |
| 6,684,348 B1 | 1/2004 | Edwards et al. | |

(Continued)

FOREIGN PATENT DOCUMENTS

WO    WO03032174    * 4/2003

OTHER PUBLICATIONS

Meier et al. Bus Station, English translation of WO2003032174 and Figures, Publication Date Apr. 17, 2003, 9 pages.*

*Primary Examiner*—Jacques H Louis-Jacques
*Assistant Examiner*—John J Tabone, Jr.

(57) ABSTRACT

A match circuit connected to a bus carrying data is described. In one embodiment, the match circuit includes logic for activating a decoded_match signal, the logic for activating a decoded match signal comprising logic for decoding a sum field comprising a selected portion of the data into a decoded_sum signal, wherein an active bit of the decoded_sum field corresponds to a value of the sum field; and logic for comparing the decoded_sum signal with a mask signal and outputting a binary bit comprising a decoded_match signal indicative of whether the decoded_sum signal and the mask signal match.

21 Claims, 3 Drawing Sheets

U.S. PATENT DOCUMENTS 6,732,307 B1    5/2004   Edwards
7,404,112 B2 *   7/2008   Adkisson et al. ............ 714/706
7,430,696 B2 *   9/2008   Adkisson et al. ............ 714/724
2005/0038930 A1 *   2/2005   Meier et al. ................... 710/15

* cited by examiner

DECODED MATCH CIRCUIT FOR PERFORMANCE COUNTER

PRIORITY UNDER 35 U.S.C. §120 AND 37 C.F.R. §1.78

This application is a continuation-in-part of the following co-pending United States nonprovisional patent application(s): (i) "GENERAL PURPOSE PERFORMANCE COUNTER," application Ser. No. 10/635,083, filed on Aug. 6, 2003, in the name(s) of Richard W. Adkisson and Tyler J. Johnson now U.S. Pat. No. 7,424,397; and (ii) "MATCH CIRCUIT FOR PERFORMANCE COUNTER," application Ser. No. 10/635,373, filed Aug. 6, 2003, in the name(s) of Richard W. Adkisson and Tyler J. Johnson now U.S. Pat. No. 7,331,003 ; both of which are hereby incorporated by reference in their entirety.

CROSS-REFERENCE TO RELATED APPLICATIONS

This application is related to U.S. patent application Ser. No. 10/635,103, filed Aug. 6, 2003 entitled "DATA SELECTION CIRCUIT FOR PERFORMANCE COUNTER", now U.S. Pat. No. 7,404,112, and U.S. patent application Ser. No.: 10/635,079, filed Aug. 6, 2003 entitled "ZEROING CIRCUIT FOR PERFORMANCE COUNTER", now U.S. Pat. No. 7,430,696, both of which are hereby incorporated by reference in their entirety.

BACKGROUND

Increasing demand for computer system scalability (i.e., consistent price and performance and higher processor counts) combined with increases in performance of individual components continues to drive systems manufacturers to optimize core system architectures. One such systems manufacturer has introduced a server system that meets these demands for scalability with a family of application specific integrated circuits ("ASICs") that provide scalability to tens or hundreds of processors, while maintaining a high degree of performance, reliability, and efficiency. The key ASIC in this system architecture is a cell controller ("CC"), which is a processor-I/O-memory interconnect and is responsible for communications and data transfers, cache coherency, and for providing an interface to other hierarchies of the memory subsystem.

In general, the CC comprises several major functional units, including one or more processor interfaces, memory units, I/O controllers, and external crossbar interfaces all interconnected via a central data path ("CDP"). Internal signals from these units are collected on a performance monitor bus ("PMB"). One or more specialized performance counters, or performance monitors, are connected to the PMB and are useful in collecting data from the PMB for use in debugging and assessing the performance of the system of which the CC is a part. Currently, each of the performance counters is capable of collecting data from only one preselected portion of the PMB, such that the combination of all of the performance counters together can collect all of the data on the PMB. While this arrangement is useful in some situations, there are many situations in which it would be advantageous for more than one of the performance counters to access data from the same portion of the PMB. Additionally, it would be advantageous to be able to use the performance counters in the area of determining test coverage. Finally, it would be advantageous to be able to use the performance counters to match arbitrary combinations of patterns aligned on block boundaries. These applications are not supported by the state-of-the-art performance counters.

SUMMARY

In one embodiment, the invention is directed to a match circuit connected to a bus carrying data. The match circuit includes logic for activating a decoded_match signal, the logic for activating a decoded match signal comprising logic for decoding a sum field comprising a selected portion of the data into a decoded_sum signal, wherein an active bit of the decoded_sum field corresponds to a value of the sum field; and logic for comparing the decoded_sum signal with a mask signal and outputting a binary bit comprising a decoded_ match signal indicative of whether the decoded_sum signal and the mask signal match.

DETAILED DESCRIPTION OF THE DRAWINGS

Figure 1:
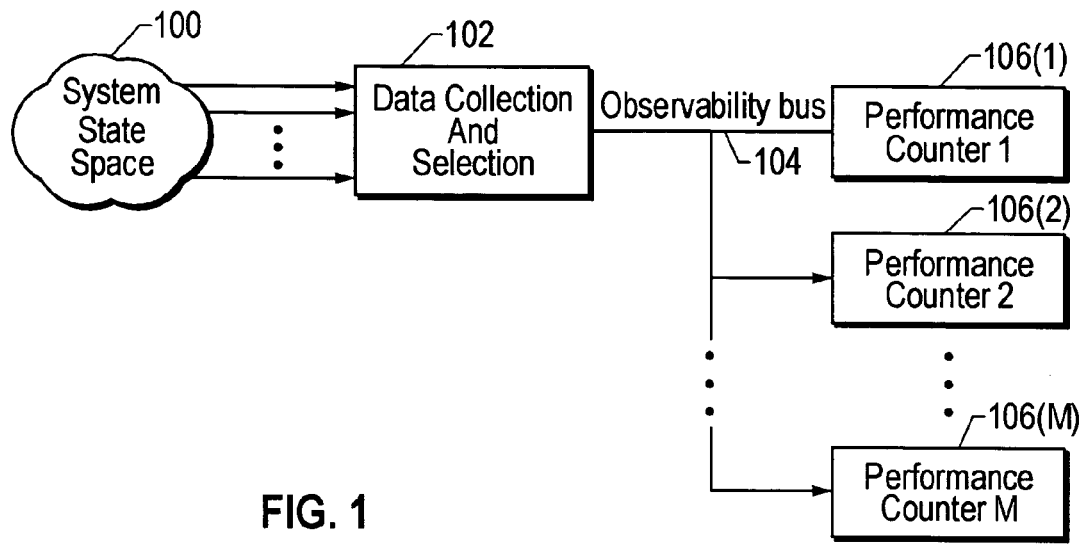
FIG. 1 is a block diagram illustrating general purpose data collection in a logic design.

In the drawings, like or similar elements are designated with identical reference numerals throughout the several views thereof, and the various elements depicted are not necessarily drawn to scale.

FIG. 1 is a block diagram of general purpose data collection in a logic design. As shown in FIG. 1, the state space 100 of a logic design under consideration is driven to data collection and selection logic 102. The logic 102 drives a D-bit data collection, or observability, bus 104 carrying a D-bit debug_ bus signal to a plurality of performance counters 106(1)-106 (M). In one embodiment, D is equal to 80, M is equal to 12, and performance counters 106(1)-106(M-1) are general purpose performance counters, while the remaining performance counter 106 (M) increments on every clock cycle. As will be illustrated below, the general purpose performance counters are "general purpose" in that each of them is capable of accessing any bit of the 80-bits on the bus 104; moreover, all of them may access the same block of bits and do the same or different performance calculations thereon.

Figure 2:
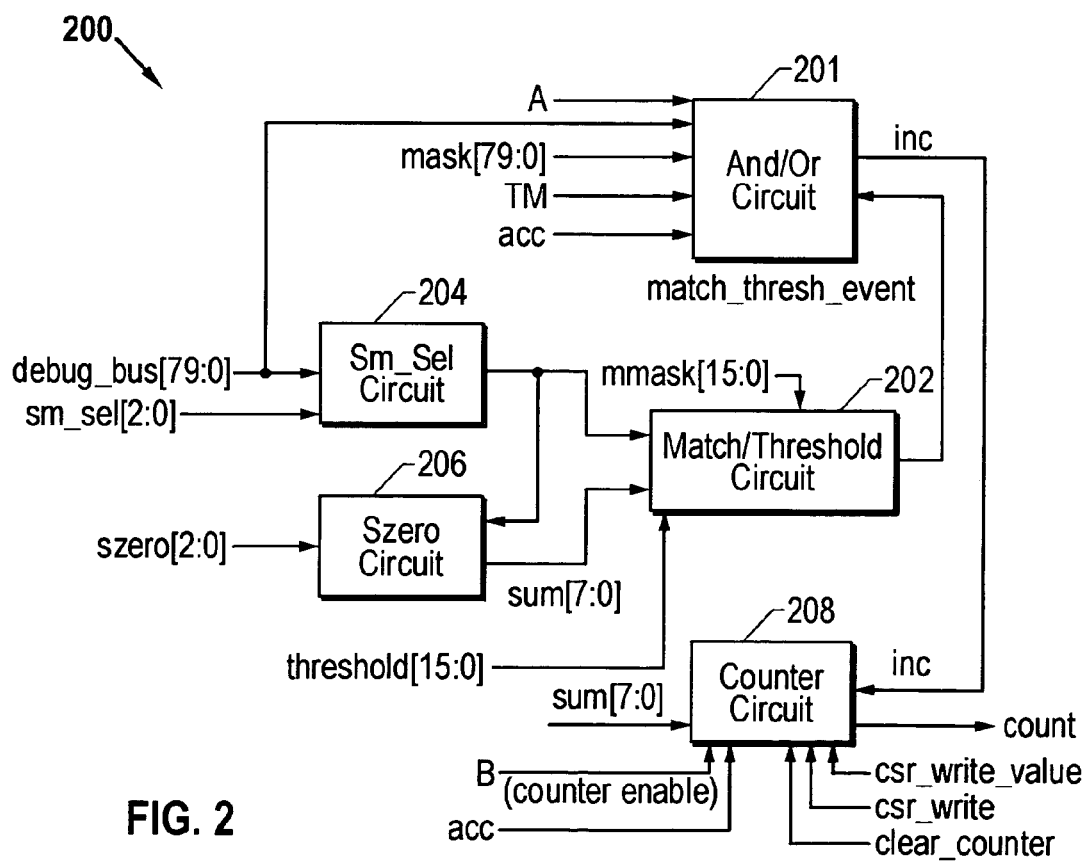
FIG. 2 is a block diagram of a general purpose performance counter according to one embodiment.

FIG. 2 is a block diagram of a general purpose performance counter 200, which is identical in all respects to each of the performance counters 106(1)-106 (M-1) (FIG. 1), in accordance with one embodiment. As will be described in greater detail below, the performance counter 200 can be used to perform general purpose operations to extract performance, debug, or coverage information with respect to any system under test (SUT) such as, for instance, the system state space 100 shown in FIG. 1. The performance counter 200 includes an AND/OR circuit 201, a match/threshold circuit 202, an sm_sel circuit 204, an szero circuit 206, and a counter circuit 208.

Figure 3:
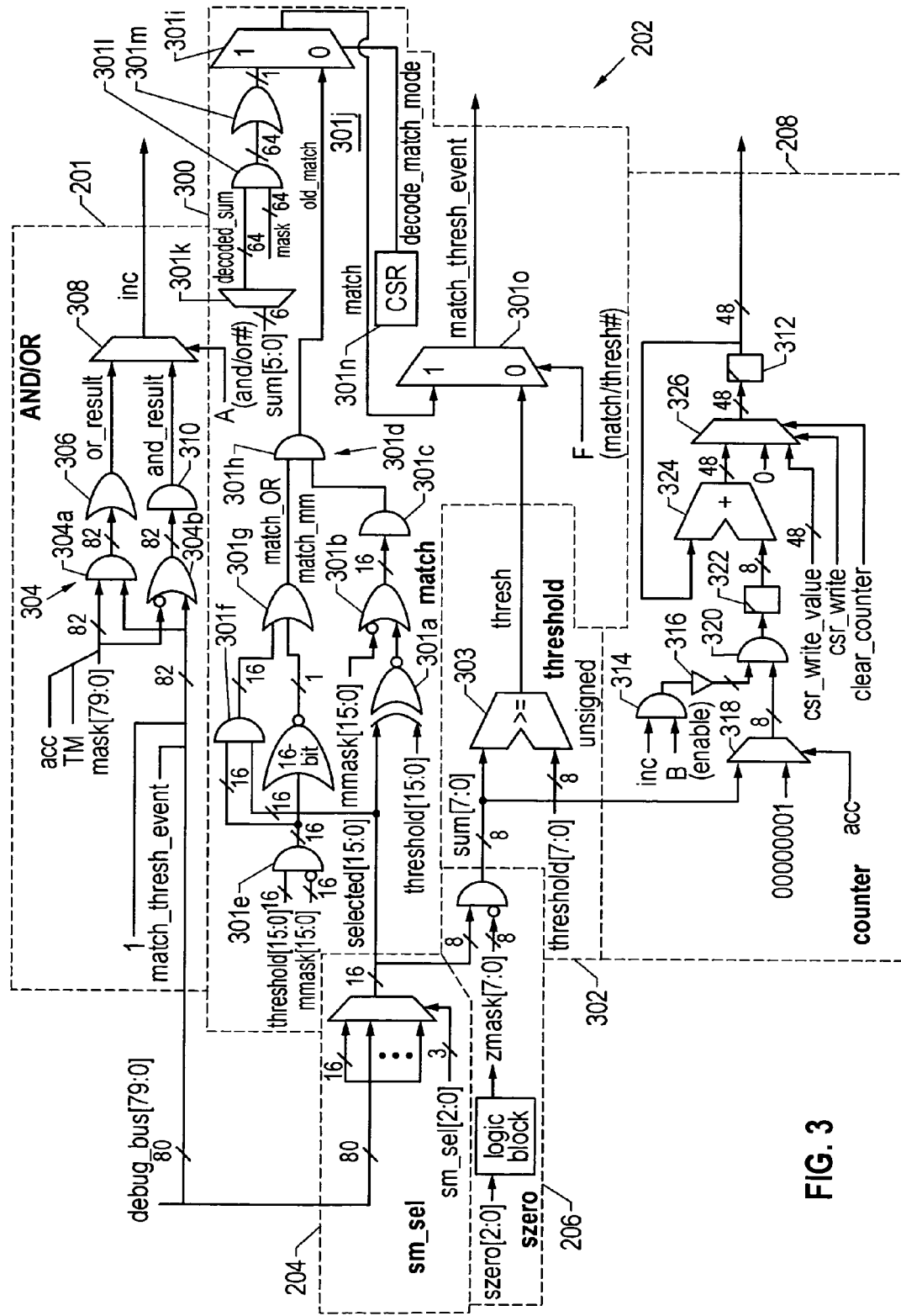
FIG. 3 is a more detailed block diagram of the general purpose performance counter of FIG. 2 wherein an embodiment of a match/threshold circuit is illustrated.

In general, the AND/OR circuit 201 enables access to all of the bits of the debug_bus signal coming into the performance counter 200 via the observability bus 104. In one embodiment, as illustrated in FIGS. 2 and 3, debug_bus is an 80-bit signal. When the AND/OR circuit 201 is operating in AND mode, the circuit activates an "inc" signal to the counter circuit 208 if all of the bits of the debug_bus signal plus two bits that are appended thereto, as will be described in greater detail below, that are of interest (as indicated by the value of an 80-bit "mask" plus two bits that are appended thereto) are set. When the AND/OR circuit 201 is operating in OR mode, the circuit activates the inc signal to the counter circuit 208 if any one or more of the bits of the debug_bus signal plus the two additional bits that are of interest (as indicated by the value the mask plus the two additional bits) are set.

When the match/threshold circuit 202 is operating in "match" mode, a match portion 300 (FIG. 3) of the circuit activates a match_thresh_event signal to the AND/OR circuit 201 when an N-bit portion of the debug_bus signal selected as described in greater detail below with reference to the sm_sel circuit 204 and the szero circuit 206 matches an N-bit threshold (or pattern) for all bits selected by an N-bit match mask ("mmask"). In one embodiment, for all bits of the selected N-bit debug bus signal portion that are "don't cares", the corresponding bit of mmask will be set to 0 and the corresponding bit of the threshold will be set to 0. For all bits of the selected N-bit debug bus signal portion that are "ORs" or "Rs", as will be described in detail below, the corresponding bit of mmask will be set to 0 and the corresponding bit of the threshold will be set to 1. Finally, for all bits of the selected N-bit debug bus signal portion that are not "don't cares" or "ORs", the corresponding bit of mmask will be set to 1.

The embodiment described herein enhances the normal match with an "R" term without using any control bits in addition to mmask (the mask) and threshold (the match). This embodiment can be used for any match circuit and for any pattern recognition; it is not limited to performance counters. In particular, a match occurs if any "R" bit is a one. This is the equivalent of an ORing of all "R" input bits. If all "R" bits are zero, there is no match.

The match_thresh_event signal is one of the two bits appended to the debug_bus signal. In the illustrated embodiment, N is equal to 16.

In general, when the match/threshold circuit 202 is operating in match mode, the match portion 300 detects in the debug_bus signal any arbitrary binary pattern of up to N bits aligned on 10-bit block boundaries. This includes matching a one, zero, or "don't care" ("X") on any bit. Additionally, as indicated above, in one embodiment, the detecting includes matching the results of an "OR" operation on all designated bits ("R"). This allows detection of specific packets or specific groups of packets or states.

In one embodiment, the match portion 300 comprises an exclusive NOR ("XNOR") circuit, represented in FIG. 3 by a single XNOR gate 301a, for bit-wise exclusive-NORing ("XNORing") a selected N-bit portion of the debug_bus signal output from the sm_sel circuit 204, as described in detail below, with an N-bit threshold which may be output from a control status register ("CSR")(not shown), for example. An N-bit signal output (i.e., a first intermediary output) from the XNOR circuit (represented by the XNOR gate 301a, although there may be as many as N such gates) is input to an OR circuit, represented in FIG. 3 by a single OR gate 301b, where it is bit-wise ORed with the inverse of the N-bit mmask, which may be provided by a CSR (not shown) in one embodiment. The N-bit output (i.e., a second intermediary output) of the OR circuit represented by the OR gate 301b (each of the N output bits being generated by a signal 2-input OR gate) are input to an N-bit AND gate 301c, the output of which comprises a one-bit "match_mm" signal.

The match circuit 300 further includes an enhancement portion 301d for matching the "R" bits. The enhancement portion 301d includes an AND circuit, represented in FIG. 3 by a single AND gate 301e, for bit-wise ANDing the inverse of the N-bit mmask with the N-bit threshold. The N-bit output of the AND circuit 301e is input to an AND circuit, represented in FIG. 3 by a single AND gate 301f, where it is bit-wise ANDed with the selected N-bit portion of the debug_bus signal output from the sm_sel circuit 204. The N-bit output of the AND circuit 301f is input to an N+1 input OR circuit 301g, where it is ORed with the single-bit NOR (provided by N-bit NOR gate) of the N-bit output of the AND circuit 301e to generate a single bit "match_OR" signal. The match_OR signal and the match_mm signal are input to an AND gate 301h, the output of which is an old_match signal that is input to one input of a two-input MUX 301i.

The match circuit 300 further includes a decoded match portion 301j. In the decoded match portion 301j, a sum[5:0] field, comprising the lowest six bits of a selected[15:0] field output from the sm_sel circuit 204, is input to a decoder 301k, the output of which is a decoded_sum signal comprising 64 "one hot" signals. It will be recognized that if the value of sum[5:0] is equal to x, then bit x of the decoded_sum signal will be "hot" or active and the remaining bits will be zero. For example, if sum[5:0] is 000011, then decoded_sum[3] will be high and decoded_sum[63:4] and decoded_sum[2:0] will be low. The decoded_sum signal is ANDed with a 64-bit mask designated "mask[63:0]" via an AND circuit comprising 64 two-input AND gates, represented by an AND gate 301l. The output of the AND circuit 301l is input to a 64-input OR gate 301m, the output of which comprises a decoded_match signal that is activated if any of the "one hots" of the decoded_sum signal designated by mask[63:0] is active. The decoded_match signal is input to a second input of the MUX 301i. A control signal designated as decode_match_mode from a CSR 301n controls operation of the MUX 301i to output either the output of the AND gate 301h (when the decode_match_mode control signal is deactivated and the match portion 300 is not operating in decode match mode) or the output of the OR gate 301m (when the decode_match_mode signal is activated and the match portion 300 is operating in decode match mode) as a match signal.

The match signal output from the MUX 301i is input to a first input of a MUX 301o. When the match/threshold circuit 202 is operating in match mode (as controlled by a selection control signal, e.g., the match/thresh# control signal), the match signal is output from the MUX 301o as the match_thresh_event signal to the AND/OR circuit, as described above.

As a result of the operation of the match portion 300, no extra random logic is required for decoding packets or states into "one-hot" signals, which are 1-bit signals that transition to a logic "1" for each value of the state. The match/threshold circuit 202 requires an N-bit pattern field and an N-bit mask field. In addition, the embodiment described herein can match a wider range of patterns than a conventional match circuit, which corresponds to a level of AND gates. The enhancement portion 301d adds a level of OR gates to the AND gates. For example, a conventional match circuit matches if all "1" bits are one, all "0" bits are zero, and all other bits are "don't care". The enhancement portion 301d generates a match if all "1" bits are one, all "0" bits are zero, all "X" bits are "don't care", and at least one of the "R" bits is one. The decoded match circuit portion 301j adds the ability to match arbitrary combinations of patterns within the data with a single performance counter.

The ability of the decoded match portion 301j to match arbitrary patterns of patterns will be described in greater detail below. In particular, it will be recognized that an n-bit input at the decoder 301k produces $2^n$ patterns. Accordingly, $2^P$ combinations can occur, where P is equal to $2^n$. As an example, assuming n is equal to 2, there are $2^2$, or 4, patterns (0, 1, 2, or 3), and $2^4$, or 16, combinations of patterns. The decoded match portion 301j enables the match circuit 300 to match all 16 combinations of patterns produced by a 2-bit input the decoder 301k. These 16 possible combinations are set forth in Table I below:

TABLE I

| 1 | match none |
|---|---|
| 2 | match 0 |
| 3 | match 1 |
| 4 | match 2 |
| 5 | match 3 |
| 6 | match 0 or 1 |
| 7 | match 0 or 2 |
| 8 | match 0 or 3 |
| 9 | match 1 or 2 |
| 10 | match 1 or 3 |
| 11 | match 2 or 3 |
| 12 | match 0 or 1 or 2 |
| 13 | match 0 or 2 or 3 |
| 14 | match 0 or 1 or 3 |
| 15 | match 1 or 2 or 3 |
| 16 | match 0 or 1 or 2 or 3 |

Assuming that n is equal to 6, as in the illustrated embodiment, $2^n$, or 64, patterns can be produced; accordingly, $2^{64}$, or $1.8447 \times 10^{19}$, combinations can be matched by the decoded match portion 301j.

An example of the usefulness of the embodiment of the match portion 300 including the decoded match portion 301j is as follows. Given bits specifying a transaction type and four additional bits each indicating one of four destinations, a conventional match circuit cannot indicate a "match" if the specification transaction type is sent to any one of the four destinations. The embodiment illustrated herein can accomplish this result by using an "R" term for the four destination bits. As a result, the embodiment illustrated herein can add a level of logic without using any more control bits, thus allowing more patterns to be matched.

To reduce the number of control bits required, in the embodiment illustrated in FIG. 3, the N-bit pattern field is the same field used for a threshold portion 302 of the circuit 202, as described below, as it is unlikely that both the match portion 300 and the threshold portion 302 will be used at the same time, especially if the sm_sel circuit 204 supplies the same N bits to both.

The decoded match portion 301j enables the match circuit 300 to match arbitrary combinations of patterns. For example, if there is a six-bit field and one wishes to match a 0x1e, 0x25, 0x1a, 0x3f, 0x00, or a 0x07, then the circuit 300 can accomplish this. This example is typical of the case in which one wishes to count certain sets of transaction types. This can be accomplished with N counters, but typically, the number of counters is limited. This invention enables such counting to be accomplished with a single counter.

As alluded to previously, with a six-bit field, $2^6=64$ patterns can be produced. The decoded matching embodiment described herein can match none, one, two, three, and so on up to all 64 of them. Specifically, there are $2^{64}=1.8447E19$ combinations and the illustrated embodiment can match any of them.

When the match/threshold circuit 202 is operating in "threshold" mode, the threshold portion 302 of the circuit 202 activates the match_thresh_event signal to the AND/OR circuit 201 when an S-bit portion of the debug_bus signal selected and zeroed as described in greater detail below with reference to the sm_sel circuit 204 and the szero circuit 206 is equal to or greater than the threshold. In the illustrated embodiment, S is equal to N/2, or 8.

A compare circuit 303 of the threshold portion 302 compares a sum[7:0] signal output from the szero circuit 206, described below, with the least significant S bits of the N-bit threshold signal and outputs a logic one if the former is greater than or equal to the latter and a zero if it is not. The output of the compare circuit 303 is input to a second input of the MUX 301o as a thresh signal. When the match/threshold circuit 202 is operating in threshold mode, the thresh signal is output from the MUX 301o as the match_thresh_event signal to the AND/OR circuit, as described above.

The sm_sel circuit 204 selects an N-bit portion of the debug_bus signal aligned on a selected 10-bit block boundary into both the match portion 300 and the threshold portion 302 (FIG. 3) of the match/threshold circuit 202 and to a sum input of the counter circuit 208. As previously stated, in the illustrated embodiment, N is equal to 16. The szero circuit 206 zeroes out none through all but one of S bits aligned on a selected 10-bit block boundary into the threshold portion 302 of the match/threshold circuit 202 and the sum input of the counter circuit 208. In the illustrated embodiment, S is equal to eight. The selected 10-bit block boundary is identified by the value of a three-bit control signal sm_sel input to the sm_sel circuit 204.

Additional details regarding the operation of the sm_sel circuit 204 and the szero circuit 206 are provided in U.S. patent application Ser. No.: 10/635,103, filed Aug. 6, 2003 entitled "DATA SELECTION CIRCUIT FOR PERFORMANCE COUNTER" and U.S. patent application Ser. No.: 10/635,079, filed Aug. 6, 2003 entitled "ZEROING CIRCUIT FOR PERFORMANCE COUNTER".

In one embodiment, each general purpose performance counter, such as the performance counter 200, is 48 bits plus overflow. The performance counter 200 is general purpose in that it looks at all D bits of the debug_bus signal for an event mask plus two extra events, eight separate selections of 16 bits for the match compare operation and eight separate selections of eight bits for the threshold compare and the accumulate operations. The eight bits for the threshold compare and the accumulate operations are the bottom eight bits of the 16 bits selected for the match compare operation. Those 16 bits are aligned to 10 slot boundaries as shown in an exemplary mapping arrangement illustrated in FIG. 4.

Figure 4:
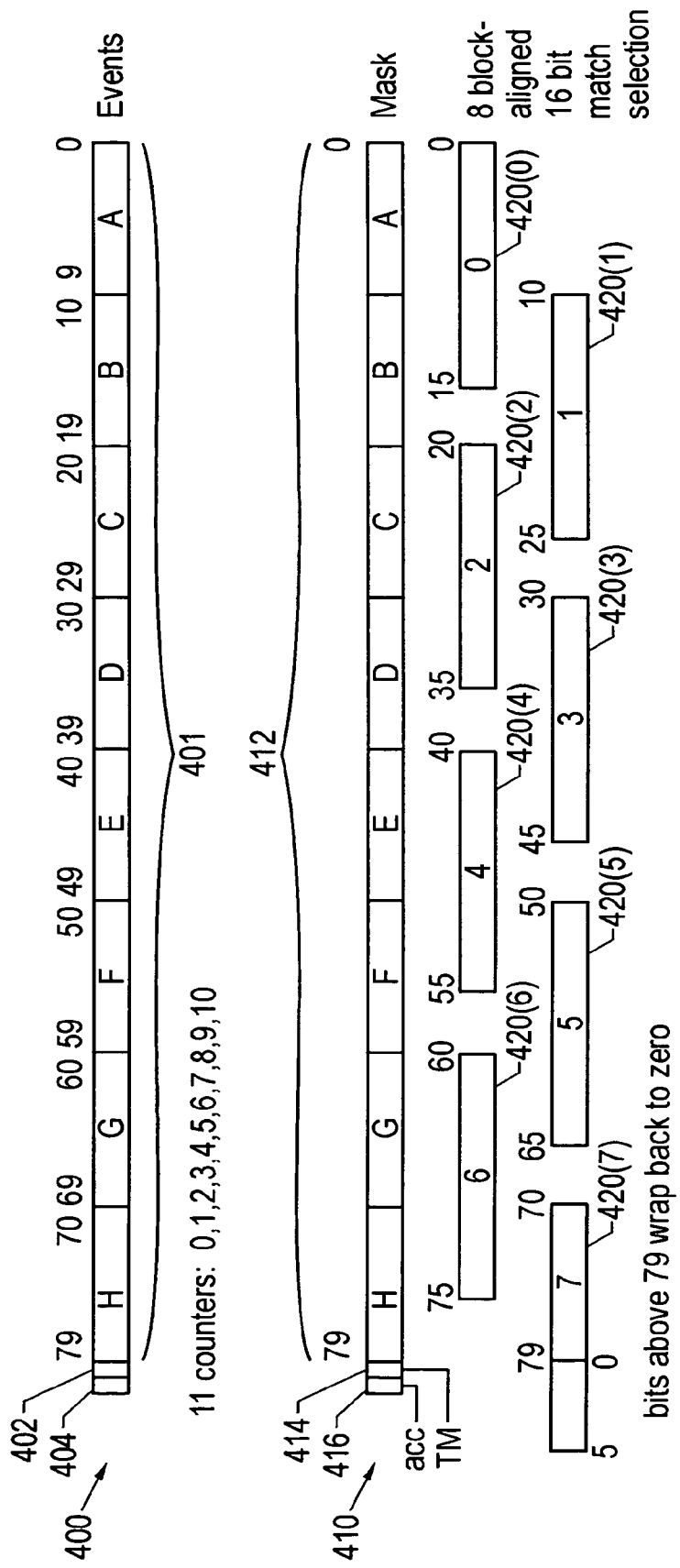
FIG. 4 illustrates a method in which signals are mapped from an observabilty bus to a performance counter in accordance with one embodiment.

In FIG. 4, an events signal 400 comprises the debug_bus signal, designated in FIG. 4 by reference numeral 401, the match_threshold_event signal, designated by reference numeral 402 and a logic 1 bit, designated by reference numeral 404. The debug_bus signal 401 comprises bits [79:0] of the events signal 400; the match_threshold_event signal 402 comprises bit [80] of the events signal, and the logic 1 bit 404 comprises bit [81] of the events signal.

As best illustrated in FIG. 3, the events signal 400 (i.e., the debug_bus signal with the match_threshold_event signal and the logic 1 appended thereto) are input to a first logic stage 304 of the AND/OR circuit 201 for purposes that will be described in greater detail below.

Referring again to FIG. 4, a composite mask signal 410 comprises an 80-bit mask signal, designated by a reference numeral 412, a match_threshold_event mask ("TM") bit, designated by reference numeral 414, and an accumulate bit ("acc"), designated by reference numeral 416. The mask signal 412 comprises bits [79:0] of the composite mask signal 410; the TM bit 414 comprises bit [80] of the composite mask signal, and the acc bit 416 comprises bit [81] of the composite mask signal. As best illustrated in FIG. 3, each bit of the composite mask 410 (i.e., the mask signal with the TM and acc bits appended thereto) is input to the first logic stage 304 of the AND/OR circuit 201 for purposes that will be described in greater detail below.

Continuing to refer to FIG. 4, eight 10-bit-block-aligned 16-bit match selections are respectively designated by reference numerals 420(0)-420(7). In particular, the selection 420(0) comprises bits [0:15]; the selection 420(1) comprises bits [10:25]; the selection 420(2) comprises bits [20:35]; the selection 420(3) comprises bits [30:45]; the selection 420(4) comprises bits [40:55]; the selection 420(5) comprises bits [50:65]; the selection 420(6) comprises bits [60:75]; and the selection 420(7) comprises bits [70:5] (bits above 79 wrap back to zero.

Referring again to FIG. 3, the first logic stage 304 comprises an AND portion, represented by an AND gate 304a, for bit-wise ANDing the events signal 400 with the composite mask signal 410, and an OR portion, represented by an OR gate 304b, for bit-wise ORing the inverse of the composite mask signal 410 with the events signal 400. It will be recognized that, although represented in FIG. 3 as a single two-input AND gate 304a, the AND portion of the first logic stage 304 actually comprises 82 two-input AND gates. Similarly, the OR portion of the first logic stage 304 comprises 82 two-input OR gates identical to the OR gate 304b.

The outputs of the AND portion of the first logic stage 304 are input to an 82-input OR gate 306, the output of which is input to one input of a two-input MUX 308 as an "or_result". Similarly, the outputs of the OR portion of the first logic stage 304 are input to an 82-input AND gate 310, the output of which is input to the other input of the MUX 308 as an "and_result". A control signal ("and/or#") which may originate from a CSR (not shown) controls whether the AND/OR circuit 201 functions in AND mode, in which case the and_result is output from the MUX 308 as the inc signal, or in OR mode, in which case the or_result is output from the MUX as the inc signal.

As a result, when the AND/OR circuit 201 is operating in the AND mode, the inc signal comprises the and_result signal and will be activated when all of the bits of the events signal 400 that are of interest as specified by the composite mask 410 are set. When the AND/OR circuit 201 is operating in OR mode, the inc signal comprises the or_result signal and will be activated when any one of the bits of the events signal 400 that are of interest as specified by the composite mask 410 is set.

The acc bit 416 of the composite mask 410 is CSR-settable. Setting the TM bit 414 in the composite mask 410 designates the match_thresh_event signal in the events signal as a bit of interest; not setting the TM bit in the composite mask will cause the value of the match_thresh_event signal in the events signal 400, and hence the result of any match or threshold operation performed by the match/threshold circuit 202, to be ignored.

Continuing to refer to FIG. 3, the operation of an embodiment of the counter circuit 208 will be described in greater detail. The counter circuit 208 is an X bit counter that can hold, increment by one, add S bits, clear, or load a value into a count value register 312. Other processing may also occur in order to read the value of the register 312. In the embodiment illustrated in FIG. 3, X is equal to 48. Counter circuit 208 operation is enabled by setting a counter enable signal B, which comprises one input of a two-input AND gate 314. The other input of the AND gate 314 is connected to receive the inc signal from the AND/OR circuit 201. Accordingly, when the counter circuit 208 is enabled and the inc signal is activated, a logic one is output from the AND gate 314. In any other case, the output of the AND gate 314 will be a logic zero. The output of the AND gate 314 is replicated by an 8×replicator 316 and the resulting 8-bit signal is bit-wise ANDed with an 8-bit signal output from a MUX circuit 318. The inputs to the MUX circuit 318 are the sum[7:0] signal output from the szero circuit 206 and an 8-bit signal the value of which is [00000001]. The sum[7:0] signal will be output from the MUX circuit 318 when the acc signal is activated; otherwise, the [00000001] signal will be output from the MUX circuit.

An AND circuit, represented by an AND gate 320, bit-wise ANDs the signals output from the replicator 316 and from the MUX circuit 318. The resulting 8-bit signal is input to a register 322. An adder 324 adds the 8-bit signal stored in the register 322 to the 48-bit sum stored in the count value register 312. The new sum output from the adder 324 is input to a MUX circuit 326. Two other sets of inputs to the MUX circuit 326 are connected to a logic zero and a csr_write_value, respectively. When a csr_write enable signal to the MUX circuit 326 is activated, the value of csr_write_value is output from the MUX circuit 326 and written to the count value register 312. In this manner, a value can be loaded into the count value register 312. Similarly, when the clear_counter signal is asserted, 48 zero bits are output from the MUX circuit 326 to the count value register 312, thereby clearing the register.

If neither the csr_write signal nor the clear_counter signal is asserted and the acc signal is asserted, the output of the adder 324 is written to the count value register 312, thereby effectively adding S bits (i.e., the value of the sum[7:0] signal) to the previous value of the count value register 312. Not enabling the counter circuit 208 results in the count value register 312 being held at its current value. Finally, to increment the value of the count value register 312 by one, the counter circuit 208 must be enabled, the inc signal must be asserted, and the acc signal must not be asserted.

As described in detail above, FIG. 4 illustrates that the entire data collection bus 104 (FIG. 1) is available for all of the performance counters represented by the performance counter 200, making them general purpose. All D bits of the debug_bus signal can be used by the AND/OR circuit 201. N bits aligned on block boundaries can be selected by the sm_sel circuit 206, enabling full coverage of the observabilty bus 104.

Previous performance counters could only match ones or use thresholding. The embodiment described herein, using the match portion 300 of the match/threshold circuit 202, can match ones, zeros, "don't care", and "ORed" bits. It can also match groups of packets and states. For example, it can match all packets with a "ROXR1" pattern in bit positions 6 through 2 regardless of the values of the other bits or bit 4. It eliminates the need for the logic being analyzed (i.e., debugged, performance-counted, or test-covered, et cetera) to have extra logic to decode specific patterns into one-hot signals, rendering a performance counter in which it is implemented more general purpose.

As previously mentioned, prior art performance counter designs were not general purpose, in that they have limited range and are designed solely for performance calculations and debug of a system design. The embodiments described herein are general purpose, in that the AND/OR circuit can perform calculations on the entire range of the data collection bus 104. The embodiments also incorporate the concept of coverage. In particular, by observing specific states in a logic design, the designer can determine how much of the state space thereof is being covered by the test vectors of a test suite. The designer can thereby gauge whether more tests need to be run and what needs to be added to fully test the entire design.

An implementation of the invention described herein thus provides a match circuit operable with a general purpose performance counter. The embodiments shown and described have been characterized as being illustrative only; it should therefore be readily understood that various changes and modifications could be made therein without departing from the scope of the present invention as set forth in the following claims. For example, while the embodiments are described with reference to an ASIC, it will be appreciated that the embodiments may be implemented in other types of ICs, such as custom chipsets, Field Programmable Gate Arrays ("FPGAs"), programmable logic devices ("PLDs"), generic array logic ("GAL") modules, and the like. Furthermore, while the embodiments shown may be implemented using CSRs, it will be appreciated that control signals may also be applied in a variety of other manners, including, for example, directly or may be applied via scan registers or Model Specific Registers ("MSRs"). Additionally, although specific bit field sizes have been illustrated with reference to the embodiments described, e.g., 16-bit threshold for pattern matching (where the bottom 8 bits are used for the threshold), 80-bit mask signal, 3-bit sm_sel, et cetera, various other implementations can also be had.

Accordingly, all such modifications, extensions, variations, amendments, additions, deletions, combinations, and the like are deemed to be within the ambit of the present invention whose scope is defined solely by the claims set forth hereinbelow.

What is claimed is:

1. A match circuit connected to a bus carrying data, the match circuit comprising:
   logic for receiving a selected portion of the data and logic for activating an old_match signal when the selected portion of the data matches a threshold for all bits selected by a match mask (mmask);
   logic for decoding a sum field within the selected portion of the data into a decoded_sum signal, wherein an active bit of the decoded_sum field corresponds to a value of the sum field;
   logic for comparing the decoded_sum signal with a mask signal and for activating a decoded_match signal when the active bit of the decoded_sum signal matches an active bit of the mask signal; and
   logic for selecting one of the old_match signal and the decoded_match signal as a match signal depending on a selected mode.

2. The match circuit of claim 1 wherein the logic for selecting the decoded_match signal when the match circuit is in decode match mode.

3. The match circuit of claim 1 wherein the logic for selecting comprises a two-input multiplexer (MUX) having a first input connected to receive the decoded_match signal, a second input connected to receive the old_match signal, and a control input for receiving a decode_match_mode signal, wherein when the decode_match_mode signal is active, the decoded_match signal is output from the two-input MUX as the match signal.

4. The match circuit of claim 1 wherein the logic for activating the old_match signal comprises:
   logic for identifying each first binary bit of the selected N-bit data portion for which a corresponding bit of mmask is a logic 1;
   logic for comparing each identified first binary bit with a corresponding bit of the threshold and outputting a binary bit comprising a match_mm signal indicative of whether the compared bits match;
   logic for identifying each second binary bit of the selected N-bit data portion for which a corresponding bit of mmask is a logic 0 and for which a corresponding bit of the threshold is a logic 1;
   logic for activating a match_OR signal if at least one of the identified second binary bits is a logic 1; and
   logic for ANDing the match_mm signal and the match_OR signal to create the old_match signal.

5. The match circuit of claim 1 wherein the logic for selecting outputs the old_match signal when the match circuit is not in decode match mode.

6. The match circuit of claim 1 wherein the sum field is n bits.

7. The match circuit of claim 6 wherein the match circuit is operable to match $2^P$ combinations of patterns of the sum field, where P is equal to $2^n$.

8. Circuitry connected to a bus carrying data, the circuitry comprising:
   means for receiving a selected portion of the data and means for activating an old_match signal when a selected portion of the data matches a threshold for all bits selected by a match mask (mmask);
   means for decoding a sum field within the selected portion of the data into a decoded_sum signal, wherein an active bit of the decoded_sum field corresponds to a value of the sum field;
   means for comparing the decoded_sum signal with a mask signal and for activating a decoded_match signal when the active bit of the decoded_sum signal matches an active bit of the mask signal; and
   means for selecting one of the old_match signal and the decoded_match signal as a match signal in dependence on a selected mode.

9. The circuitry of claim 8 wherein the means for selecting outputs the decoded_match signal when the circuitry is in decode match mode.

10. The circuitry of claim 8 wherein the means for selecting comprises a two-input multiplexer (MUX) having a first input connected to receive the decoded_match signal, a second input connected to receive the old_match signal, and a control input for receiving a decode_match_mode signal, wherein when the decode_match_mode signal is active, the decoded_match signal is output from the two-input MUX as the match signal.

11. The circuitry of claim 8 wherein the means for comprises:
   means for identifying each first binary bit of the selected N-bit data portion for which a corresponding bit of mmask is a logic 1;
   means for comparing each identified first binary bit with a corresponding bit of the threshold and outputting a binary bit comprising a match_mm signal indicative of whether the compared bits match;
   means for identifying each second binary bit of the selected N-bit data portion for which a corresponding bit of mmask is a logic 0 and for which a corresponding bit of the threshold is a logic 1;
   means for activating a match_OR signal if at least one of the identified second binary bits is a logic 1; and
   means for ANDing the match_mm signal and the match_OR signal to create the old_match signal.

12. The circuitry of claim 8 wherein the means for selecting outputs the old_match signal when the circuitry is not in decode match mode.

13. The circuitry of claim 8 wherein the sum field is n bits.

14. The circuitry of claim 13 wherein the circuitry is operable to match $2^P$ combinations of patterns of the sum field, where P is equal to $2^n$.

15. A method of generating a match signalising a match circuit connected to a bus carrying data, the method comprising:
  receiving a selected portion of the data and activating an old_match signal when a selected portion of the data matches a threshold for all bits selected by a match mask (mmask);
  decoding a sum field within the selected portion of the data into a decoded_sum signal, wherein an active bit of the decoded_sum field corresponds to a value of the sum field;
  comparing the decoded_sum signal with a mask signal and activating a decoded_match signal when the active bit of the decoded_sum signal matches an active bit of the mask signal; and
  selecting one of the old_match signal and the decoded_match signal as the match signal in dependence on a selected mode.

16. The method of claim 15 further comprising selecting the decoded_match signal when the match circuit is in decode match mode.

17. The method of claim 15 wherein the selecting comprises:
  receiving the decoded_match signal as a first input of a two-input multiplexer (MUX);
  receiving the old_match signal as a second input of the two-input MUX; and
  receiving a decode_match_mode signal as a control input of the two-input MUX;
  wherein when the decode_match_mode signal is active, the decoded_match signal is output from the two-input MUX as the match signal.

18. The method of claim 15 wherein the activating the old_match signal comprises:
  identifying each first binary bit of the selected N-bit data portion for which a corresponding bit of mmask is a logic 1;
  comparing each identified first binary bit with a corresponding bit of the threshold and outputting a binary bit comprising a match_mm signal indicative of whether the compared bits match;
  identifying each second binary bit of the selected N-bit data portion for which a corresponding bit of mmask is a logic 0 and for which a corresponding bit of the threshold is a logic 1;
  activating a match_OR signal if at least one of the identified second binary bits is a logic 1; and
  ANDing the match_mm signal and the match_OR signal to create the old_match signal.

19. The method of claim 15 further comprising selecting the old-match signal when the match circuit is not in decode match mode.

20. The method of claim 15 wherein the sum field is n bits.

21. The method of claim 20 wherein the match circuit is operable to match $2^P$ combinations of patterns of the sum field, where P is equal to $2^n$.

* * * * *

UNITED STATES PATENT AND TRADEMARK OFFICE
CERTIFICATE OF CORRECTION

PATENT NO. : 7,475,302 B2
APPLICATION NO. : 10/945056
DATED : January 6, 2009
INVENTOR(S) : Richard W. Adkisson et al.

It is certified that error appears in the above-identified patent and that said Letters Patent is hereby corrected as shown below:

In column 10, lines 50-51, in Claim 11, delete "comprises:" and insert -- activating the old_match signal comprising: --, therefor.

In column 11, line 8, in Claim 15, delete "signalising" and insert -- signal using --, therefor.

In column 12, line 26, in Claim 19, delete "old-match" and insert -- old_match --, therefor.

Signed and Sealed this

Nineteenth Day of May, 2009

JOHN DOLL
*Acting Director of the United States Patent and Trademark Office*